US012623768B2

(12) United States Patent
Buchet

(10) Patent No.: US 12,623,768 B2
(45) Date of Patent: May 12, 2026

(54) SUPPORT ASSEMBLY FOR AN AIRCRAFT DOOR

(71) Applicant: Rohr, Inc., Chula Vista, CA (US)

(72) Inventor: Damien Buchet, Toulouse (FR)

(73) Assignee: Rohr, Inc., Chula Vista, CA (US)

( * ) Notice: Subject to any disclaimer, the term of this patent is extended or adjusted under 35 U.S.C. 154(b) by 155 days.

(21) Appl. No.: 18/416,966

(22) Filed: Jan. 19, 2024

(65) Prior Publication Data

US 2024/0246655 A1     Jul. 25, 2024

Related U.S. Application Data

(60) Provisional application No. 63/440,019, filed on Jan. 19, 2023.

(51) Int. Cl.
*B64G 1/10*         (2006.01)
*B64C 1/14*         (2006.01)

(52) U.S. Cl.
CPC ............ *B64C 1/143* (2013.01); *B64C 1/1407* (2013.01)

(58) Field of Classification Search
CPC .............................. B64C 1/143; B64C 1/1407
See application file for complete search history.

(56) References Cited

U.S. PATENT DOCUMENTS

| | | | | |
|---|---|---|---|---|
| 4,106,729 | A | 8/1978 | Bergman | |
| 5,156,359 | A | 10/1992 | Noble | |
| 5,163,639 | A * | 11/1992 | Herrmann | B64C 1/1407 244/129.5 |
| 5,289,615 | A * | 3/1994 | Banks | E05D 3/122 244/905 |
| 12,065,233 | B2 * | 8/2024 | Wallenås | B64D 9/00 |
| 2016/0083071 | A1 * | 3/2016 | Pichlmaier | B64C 1/1423 92/76 |

OTHER PUBLICATIONS

EP Search Report for EP Patent Application 24152899.1 dated Jun. 21, 2024.

* cited by examiner

*Primary Examiner* — Valentina Xavier
(74) *Attorney, Agent, or Firm* — Getz Balich LLC

(57) ABSTRACT

A door assembly for an aircraft includes a door, a door hinge, and a support assembly rotatably mounting the door hinge to the door. The support assembly includes a forearm and at least one link. The forearm is rotatably mounted to the door hinge along a first rotational axis. The forearm extends along the first rotational axis between and to an upper end and a lower end. The at least one link extends between and to an inner end and an outer end. The at least one link is rotatably mounted to the forearm at the inner end. The at least one link is rotatable relative to the forearm about a second rotational axis. The at least one link is rotatably mounted to the door at the outer end. The at least one link is rotatable about the second rotational axis between and to a lowered position of the door and a raised position of the door.

19 Claims, 7 Drawing Sheets

SUPPORT ASSEMBLY FOR AN AIRCRAFT DOOR

This application claims priority to U.S. Patent Appln. No. 63/440,019 filed Jan. 19, 2023 which is hereby incorporated herein by reference in its entirety.

BACKGROUND

1. Technical Field

This disclosure relates generally to an aircraft door assembly and, more particularly, to a support assembly for guiding and supporting an aircraft door.

2. Background Information

Aircraft doors, such as passenger doors for an aircraft cabin, may be configured to facilitate evacuation of the aircraft in an emergency. Various assemblies for guiding and supporting aircraft doors for a range of opening and closing movements are known in the art. While these known assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a door assembly for an aircraft includes a door, a door hinge, and a support assembly rotatably mounting the door hinge to the door. The support assembly includes a forearm and at least one link. The forearm is rotatably mounted to the door hinge along a first rotational axis. The forearm extends along the first rotational axis between and to an upper end and a lower end. The at least one link extends between and to an inner end and an outer end. The at least one link is rotatably mounted to the forearm at the inner end. The at least one link is rotatable relative to the forearm about a second rotational axis. The at least one link is rotatably mounted to the door at the outer end. The at least one link is rotatable about the second rotational axis between and to a lowered position of the door and a raised position of the door.

In any of the aspects or embodiments described above and herein, the at least one link may include an upper link and a lower link. The lower link may be disposed at the lower end. The upper link may be disposed at the upper end.

In any of the aspects or embodiments described above and herein, the lower link may include a first arm portion, a second arm portion, and a lateral portion. The first arm portion and the second arm portion may be rotatably mounted to the forearm. The lateral portion may extend between and connect the first arm portion and the second arm portion. The lateral portion may be disposed at the door.

In any of the aspects or embodiments described above and herein, the second rotational axis of the lower link may be substantially parallel to the second rotational axis of the upper link.

In any of the aspects or embodiments described above and herein, the support assembly further may further include at least one weight compensation spring. The at least one weight compensation spring may extend between and to a lower spring end and an upper spring end. The lower spring end may be rotatably mounted to the forearm. The upper spring end may be rotatably mounted to the at least one link at the outer end.

In any of the aspects or embodiments described above and herein, the at least one spring may be configured to bias the door in the raised position.

In any of the aspects or embodiments described above and herein, the door assembly may further include an emergency puller assist system (EPAS) actuator. The EPAS actuator may extend between and connect the door hinge and the forearm.

In any of the aspects or embodiments described above and herein, the forearm may include a shaft and a base. The shaft may extend between and to the upper end and the lower end. The base may be disposed at the lower end. The base may extend between and to a proximate lateral end and a distal lateral end radially farther from the shaft than the proximate lateral end relative to the first rotational axis. The at least one link may be rotatably mounted to the base at the proximate lateral end and the distal lateral end.

In any of the aspects or embodiments described above and herein, the door assembly may further include an emergency puller assist system (EPAS) actuator. The EPAS actuator may be rotatably mounted to the door hinge. The EPAS actuator may be rotatably mounted to the base between the shaft and the distal lateral end.

In any of the aspects or embodiments described above and herein, the forearm may be configured to rotate about the first rotational axis from a first rotational position to a second rotational position as the door moves from a closed position to an open position.

According to another aspect of the present disclosure, a door assembly for an aircraft includes a door, a door hinge, and a support assembly. The support assembly includes a forearm, a lower link, an upper link, and a latch idler. The forearm is rotatably mounted to the door hinge at a distal end of the door hinge. The forearm extends between and to an upper end and a lower end. The lower link is rotatably mounted to the forearm at the lower end. The upper link is rotatably mounted to the forearm at the upper end. The lower link and the upper link are rotatably mounted to the door. The latch idler is operably connected to the forearm and mounted to the door. The latch idler is positionable, relative to the forearm, in a raised idler position or a lowered idler position to position the door in a raised door position or a lowered door position, respectively.

In any of the aspects or embodiments described above and herein, the support assembly may further include at least one weight compensation spring. The at least one weight compensation spring may extend between and to a lower spring end and an upper spring end. The lower spring end may be rotatably mounted to the forearm. The upper spring end may be rotatably mounted to the upper link.

In any of the aspects or embodiments described above and herein, the door assembly may further include a door handle positionable in a latched position or an unlatched position. The door handle may be operably connected to the latch idler. The door handle may be configured to move the latch idler from the lowered idler position to the raised idler position as the door handle moves from the latched position to the unlatched position.

In any of the aspects or embodiments described above and herein, the forearm may be configured to rotate, relative to the door hinge, about a first rotational axis from a first rotational position to a second rotational position as the door moves from a closed position to an open position.

In any of the aspects or embodiments described above and herein, the forearm may extend between and to the upper end and the lower end along the first rotational axis.

According to another aspect of the present disclosure, a door assembly for an aircraft includes a door, a door hinge, and a support assembly rotatably mounting the door hinge to the door. The support assembly includes a forearm and a lower link. The forearm includes a shaft and a base. The shaft is rotatably mounted to the door hinge along a first rotational axis. The shaft extends along the first rotational axis between and to an upper end and a lower end. The base is disposed at the lower end. The base extends between and to a proximate lateral end and a distal lateral end radially farther from the shaft than the proximate lateral end relative to the first rotational axis. The lower link is rotatably mounted to the base at the proximate lateral end and the distal lateral end about a second rotational axis. The lower link is rotatably mounted to the door. The lower link is rotatable about the second rotational axis between and to a lowered position of the door and a raised position of the door.

In any of the aspects or embodiments described above and herein, the lower link may include a first arm portion, a second arm portion, and a lateral portion. The first arm portion and the second arm portion may be rotatably mounted to the base. The lateral portion extends between and connects the first arm portion and the second arm portion. The lateral portion may be disposed at the door.

In any of the aspects or embodiments described above and herein, the door assembly may further include an emergency puller assist system (EPAS) actuator. The EPAS actuator may be rotatably mounted to the door hinge. The EPAS actuator may be rotatably mounted to the base between the shaft and the distal lateral end.

In any of the aspects or embodiments described above and herein, the support assembly may further include an upper link rotatably mounted to the shaft at the upper end and rotatably mounted to the door.

In any of the aspects or embodiments described above and herein, the support assembly may further include at least one weight compensation spring. The at least one weight compensation spring may extend between and to a lower spring end and an upper spring end. The lower spring end may be rotatably mounted to the forearm. The upper spring end may be rotatably mounted to the upper link.

The present disclosure, and all its aspects, embodiments and advantages associated therewith will become more readily apparent in view of the detailed description provided below, including the accompanying drawings.

DETAILED DESCRIPTION

Figure 1:
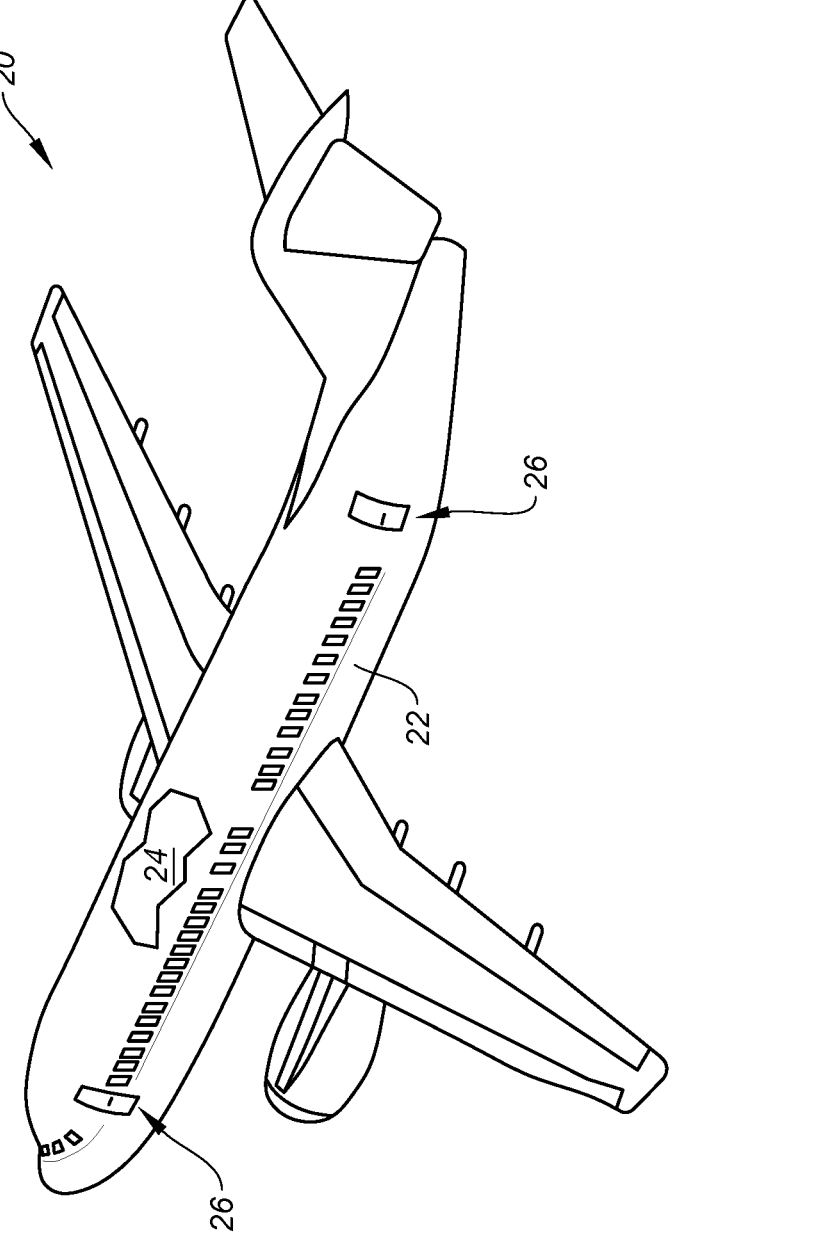
FIG. 1 illustrates a perspective view of an aircraft, in accordance with one or more embodiments of the present disclosure.

FIG. 1 illustrates an aircraft 20 such as an airplane. This aircraft 20 includes a fuselage 22. The fuselage 22 forms and surrounds a cabin 24 (e.g., a passenger cabin, a pressurized compartment, etc.) and other interior compartments (e.g., a cargo bay) of the aircraft 20. The fuselage 22 includes at least one door assembly 26 (e.g., a passenger door assembly, a service door assembly, a cargo door assembly, an emergency exit door assembly, etc.).

Figure 2:
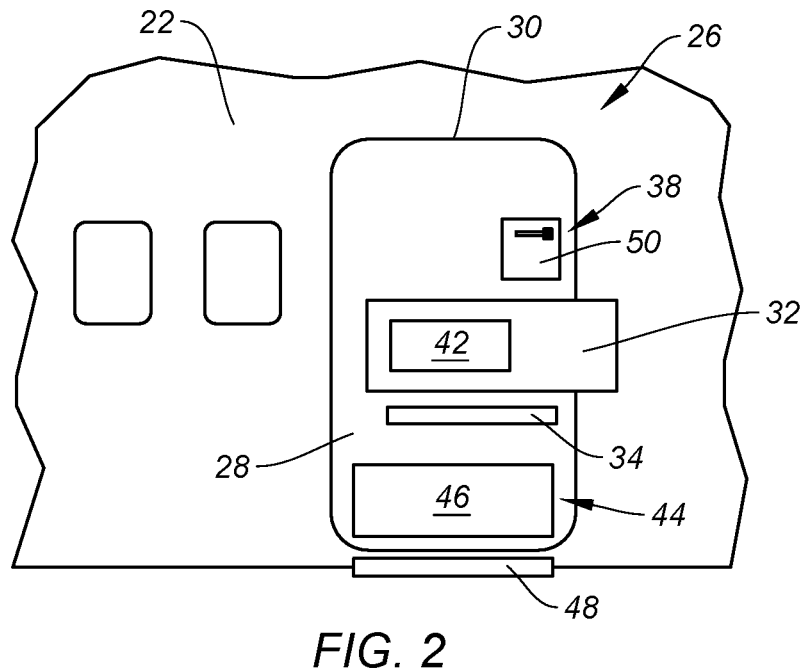
FIG. 2 schematically illustrates an interior of an aircraft door assembly and a surrounding portion of an aircraft fuselage, in accordance with one or more embodiments of the present disclosure.
Figure 3:
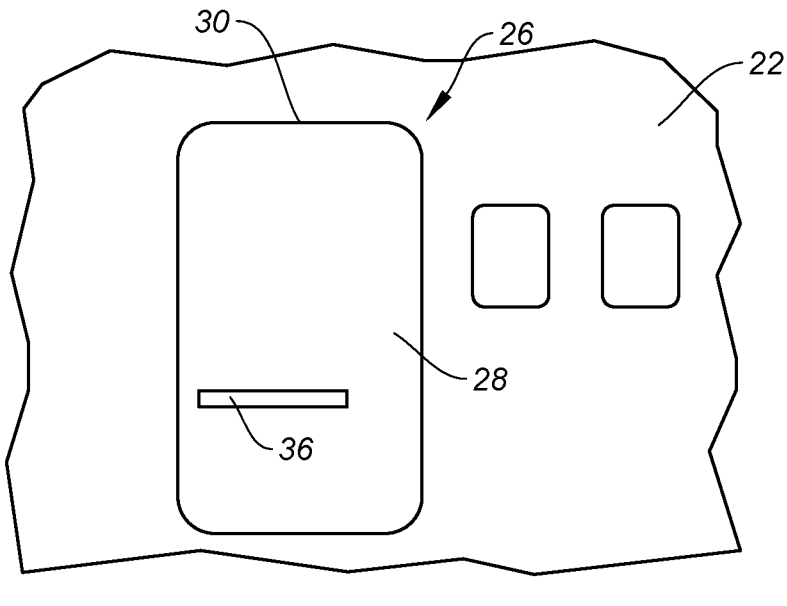
FIG. 3 schematically illustrates an exterior of the aircraft door assembly and a surrounding portion of an aircraft fuselage, in accordance with one or more embodiments of the present disclosure.

Referring to FIGS. 2 and 3, the door assembly 26 includes a door 28, a door frame 30, at least one door hinge 32, an interior door handle 34, an exterior door handle 36, and an emergency support system (ESS) 38. FIG. 2 schematically illustrates an interior view of the door assembly 26. FIG. 3 schematically illustrates an exterior view of the door assembly 26.

Figure 4A:
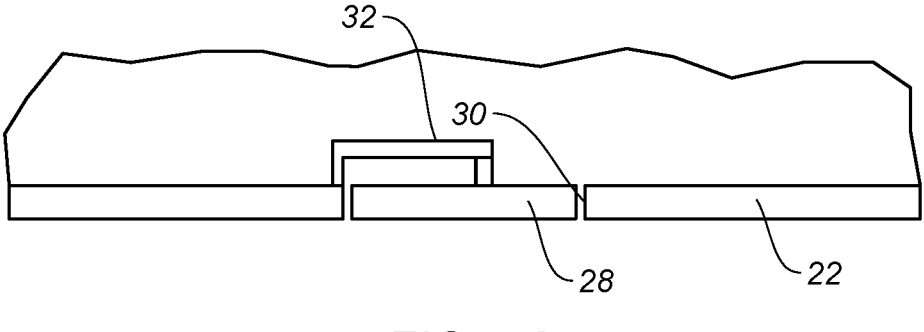
FIGS. 4A-B schematically illustrate the aircraft door assembly with a door in an open position and a closed position, in accordance with one or more embodiments of the present disclosure.
Figure 4B:
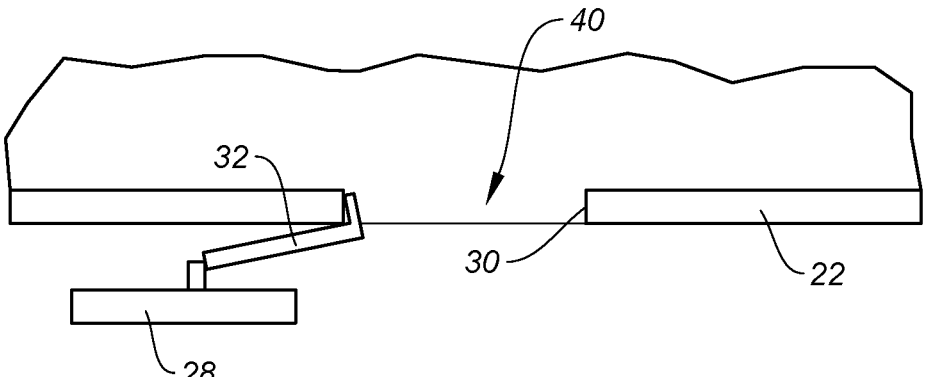

The door 28 is configured to move between a stowed, closed position (see FIG. 4A) and a deployed, open position (see FIG. 4B). For example, during opening of the door 28 of FIGS. 4A and 4B, the door 28 moves away from surrounding, fixed portions of the fuselage 22 and out of the door frame 30. Opening of the door 28 may additionally include an initial lifting motion (e.g., vertically lifting) of the door 28. The door 28 then translates laterally to a side of the door frame 30 to uncover a door opening 40. This door 28 movement is facilitated by the at least one door hinge 32. The at least one door hinge 32 movable mounts the door 28 to a fixed portion of the fuselage 22.

The door 28 may be opened (or closed) using the interior door handle 34 at an interior of the fuselage 22 and its door 28. The interior door handle 34 is rotatable between and to an unlatched position and a latched position. With the interior door handle 34 in the unlatched position, the door 28 is configured to move from the closed position to the open position. With the interior door handle 34 (and the exterior door handle 36) in the latched position, the door 28 is configured to be securely retained in the closed position (e.g., to seal the pressurized passenger cabin). The door 28 may additionally or alternatively be opened (or closed) using the exterior door handle 36 at an exterior of the fuselage 22 and its door 28. The exterior door handle 36 is rotatable between and to an unlatched position and a latched position. The exterior door handle 36 is rotatable independent of the interior door handle 34. With the exterior door handle 36 in the unlatched position, the door 28 is configured to move from the closed position to the open position. With the exterior door handle 36 (and the interior door handle 34) in the latched position, the door 28 is configured to be securely retained in the closed position (e.g., to seal the pressurized passenger cabin).

The ESS 38 is configured for use during an emergency, for example, to facilitate evacuation of the aircraft 20 using the door assembly 26. The ESS 38 may provide power for moving the door 28 from the closed position to the open position during at least some operating conditions for the door 28. For example, the ESS 38 may include an actuation system 42 (sometimes referred to as an emergency puller assist system (EPAS); e.g., a pneumatic actuation system or an electro-mechanical actuation system) configured to assist a user opening the door 28 in an emergency. The actuation system 42 of FIG. 2 is disposed at (e.g., on, adjacent, or proximate) the at least one door hinge 32. The ESS 38 may include an inflatable slide assembly 44 for the door assembly 26. The inflatable slide assembly 44 may operate in combination with or separately from the actuation system 42. The inflatable slide assembly 44 of FIG. 2 includes an inflatable slide 46 and a girt bar 48. The inflatable slide 46 may be stored within a portion of the door 28 (e.g., a slide bustle) in an undeployed condition. The girt bar 48 of FIG. 2 may be attached to a floor of the aircraft 20 at (e.g., on, adjacent, or proximate) the door 28. The inflatable slide 46 is fixedly attached to the girt bar 48. During at least some operating conditions for the door 28, such as during an emergency opening of the door for which the ESS 38 (e.g., the actuation system 42) may provide power for moving the door 28 from the closed position to the open position, the opening of the door 28 may pull the inflatable slide 46 from the door 28 (e.g., from the slide bustle). The inflatable slide 46 may then be actuated (e.g., inflated) by a compressed gas cylinder or other system for supplying compressed gas to the inflatable slide 46.

Figure 5:
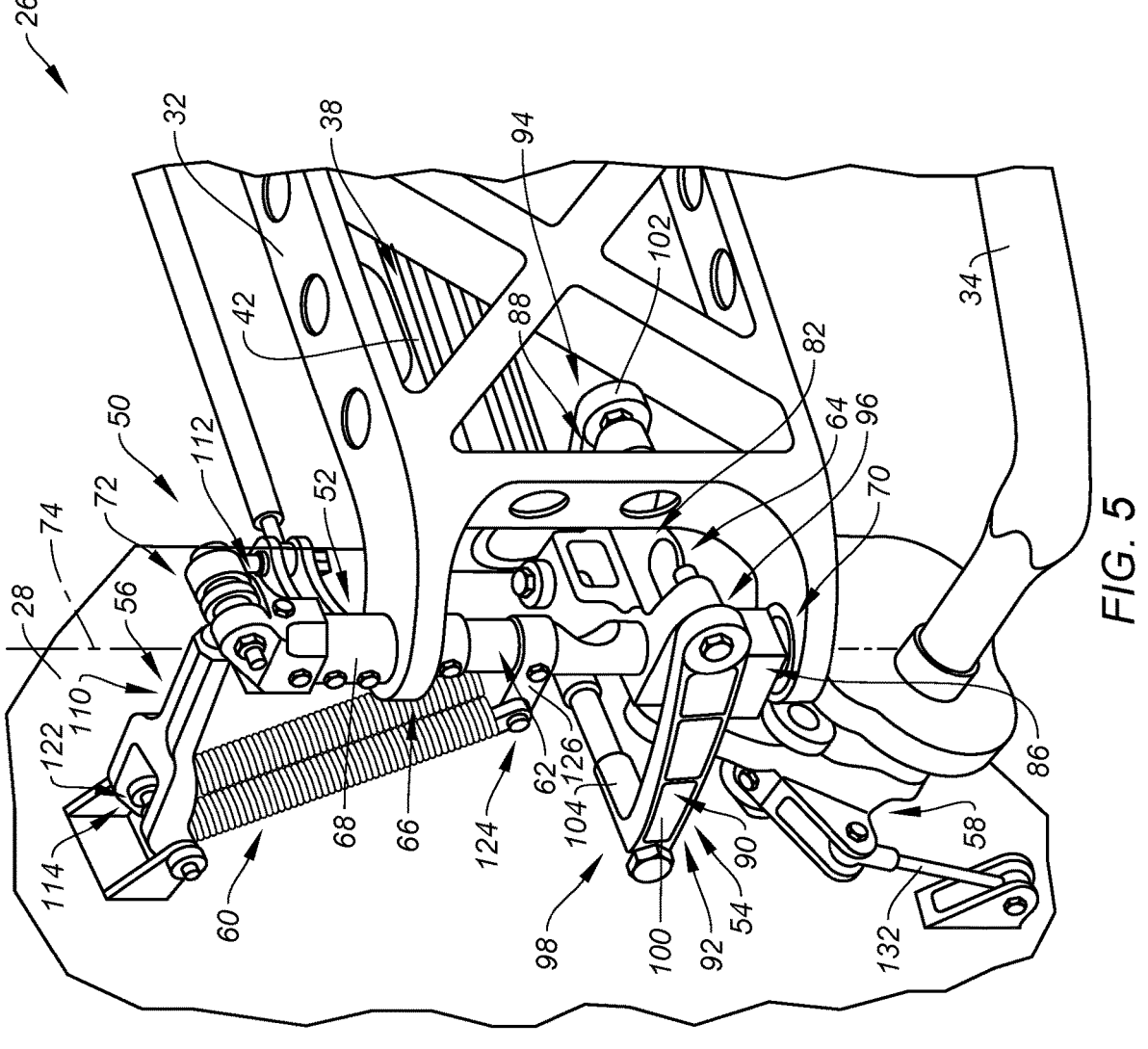
FIG. 5 illustrates a perspective view of a portion of the aircraft door assembly including a support assembly, in accordance with one or more embodiments of the present disclosure.
Figure 6:
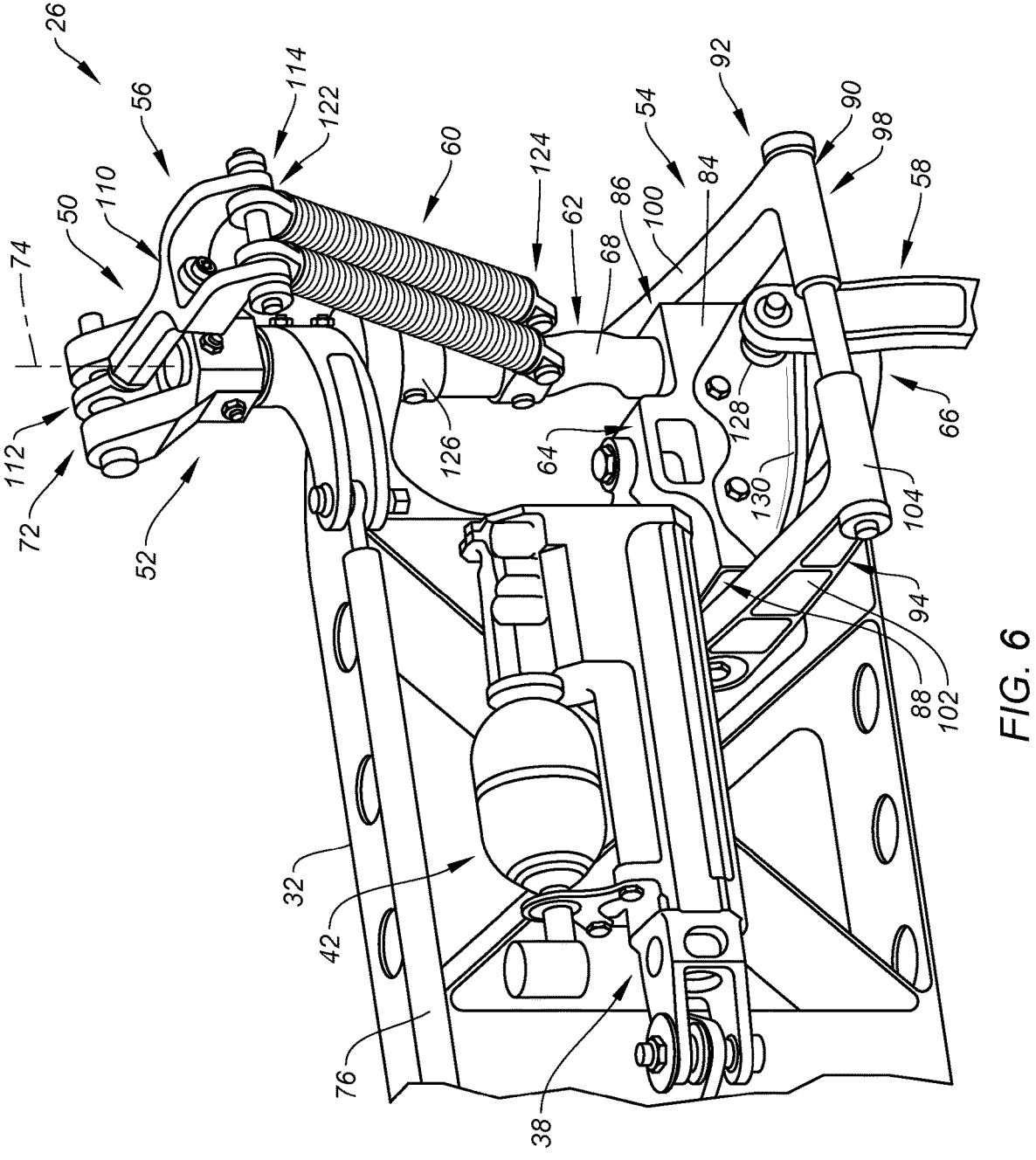
FIG. 6 illustrates another perspective view of the support assembly of FIG. 5, in accordance with one or more embodiments of the present disclosure.

Referring to FIGS. 5 and 6, the door assembly 26 further includes a support assembly 50 for the door 28. The support assembly 50 is disposed within the door 28. The support assembly 50 of FIGS. 5 and 6 includes a forearm 52, a lower link 54, an upper link 56, and a latch idler 58. The support assembly 50 may further include one or more weight compensation springs 60.

The forearm 52 is a kinematic element disposed on the door hinge 32 to (e.g., primarily) facilitate and manage a pivoting motion of the door hinge 32 and a lifting motion of the door 28 when initially opened. The forearm 52, however, may also be used to facilitate and/or support one or more other functions of the door assembly 26 such as weight compensation, operation of the ESS 38, and/or operation of a door synchronizing mechanism. The forearm 52 includes a single shaft 62 and a base 64. The forearm 52 is mounted to the door hinge 32. For example, the shaft 62 may be rotatably mounted to the door hinge 32 at (e.g., on, adjacent, or proximate) a distal end 66 of the door hinge 32. The forearm 52 may be rotatably mounted to the door hinge 32 by one or more bearings (e.g., ball bearings). The forearm 52 may be rotatable relative to the door hinge 32 about an rotational axis 74. The door hinge 32 and the forearm 52 cooperatively support and guide the door 28 relative to the fuselage 22 (e.g., the door frame 30) as the door 28 is moved between the closed position (see FIG. 4A) and the open position (see FIG. 4B).

The shaft 62 includes a shaft body 68. The shaft body 68 extends between and to a lower end 70 of the shaft body 68 and an upper end 72 of the shaft body 68 along the rotational axis 74. The shaft body 68 may be configured for rotation (e.g., relative to the door hinge 32) about the rotational axis 74. The rotational axis 74 may extend vertically or substantially vertically relative to a typically attitude (e.g., on the ground) of the aircraft 20 (see FIG. 1). The present disclosure, however, is not limited to any particular orientation of the shaft body 68 and its rotational axis 74.

The base 64 is mounted (e.g., fixedly mounted) to or otherwise formed by the shaft body 68. The base 64 of FIGS. 5 and 6 is disposed at (e.g., on, adjacent, or proximate) the lower end 70. However, the present disclosure is not limited to any particular location of the base 64 on the shaft body 68 and/or relative to the rotational axis 74. The base 64 is an enlarged portion of the forearm 52 relative to the shaft body 68. The base 64 extends between and to an inner side 82 of the base 64 and an outer side 84 of the base 64. The base 64 further extends between and to a proximate lateral end 86 of the base 64 and a distal lateral end 88 of the base 64 opposite the proximate lateral end 86. The distal lateral end 88 may be radially farther from the rotational axis 74 than the proximate lateral end 86. The base 68 may be mounted to the actuation system 42. For example, the base 68 may be rotatably mounted to the actuation system 42 radially outward of the shaft body 68 relative to the rotational axis 74, for example, radially between the rotational axis 74 and the distal lateral end 88.

Referring to FIGS. 5-8, the lower link 54 includes a link body 90. The link body 90 extends between and to a first side 92 of the link body 90 and a second side 94 of the link body 90. The link body 90 extends between and to an inner end 96 of the link body 90 and an outer end 98 of the link body 90. The link body 90 includes a first arm portion 100, a second arm portion 102, and a lateral portion 104. The first arm portion 100 extends from the inner end 96 to the outer end 98 along the first side 92. The second arm portion 102 extends from the inner end 96 to the outer end 98 along the second side 94. The lateral portion 104 extends along the outer end 98. The lateral portion 104 extends between and connects the first arm portion 100 and the second arm portion 102. The link body 90 is rotatably mounted to the forearm 52. For example, the first arm portion 100 and the second arm portion 102 may be rotatably mounted to the base 64 at (e.g., on, adjacent, or proximate) the inner end 96. The first arm portion 100 may be rotatably mounted to the proximate lateral end 86 at (e.g., on, adjacent, or proximate) the inner side 82. The second arm portion 102 may be rotatably mounted to the distal lateral end 88 at (e.g., on, adjacent, or proximate) the inner side 82. The link body 90 may be rotatably mounted to the base 64 at (e.g., on, adjacent, or proximate) a rotational axis 106 (see FIGS. 8A-B). The rotational axis 106 may extend between and through the proximate lateral end 86 and the distal lateral end 88. The link body 90 is further mounted to the door 28. For example, the firm arm portion 100 and the second arm portion 102 may be rotatably mounted to the door 28 at (e.g., on, adjacent, or proximate) the outer end 98. The link body 90 may be rotatably mounted to the door 28 at (e.g., on, adjacent, or proximate) a rotational axis 108 (see FIGS. 8A-B). The rotational axis 108 may be parallel to or substantially parallel to the rotational axis 106.

The upper link 56 includes a link body 110. The link body 110 extends between and to an inner end 112 of the link body 110 and an outer end 114 of the link body 110. The link body 110 is rotatably mounted to the forearm 52 at (e.g., on, adjacent, or proximate) the inner end 112. For example, the link body 110 may be rotatably mounted to the shaft 62 (e.g., the upper end 72). The link body 110 may be rotatably mounted to the shaft 62 at (e.g., on, adjacent, or proximate) a rotational axis 116 (see FIGS. 8A-B). The link body is rotatably mounted to the door 28 at (e.g., on, adjacent, or proximate) the outer end 114. The link body 110 may be rotatably mounted to the door 28 at (e.g., on, adjacent, or proximate) a rotational axis 118 (see FIGS. 8A-B). The rotational axis 116 may be parallel to or substantially parallel to the rotational axis 118. The rotational axis 116 and/or the rotational axis 118 may be parallel to or substantially parallel to the rotational axis 106 and/or the rotational axis 108.

The latch idler 58 is operably connected to the forearm 52. For example, the latch idler 58 of FIGS. 5 and 6 includes a roller 128 disposed on and configured to roll along a lift track 130 formed by the base 64 (e.g., along the outer side 84). The latch idler 58 of FIGS. 5 and 6 is operably connected to the interior door handle 34. The latch idler 58 is additionally mounted (e.g., rotatably mounted) to the door 28, for example, by one or more links 132. The latch idler 58 (e.g., the links 132) may be mounted directly to a body of the door 28 or to an intermediate component of the door 28 (e.g., a lift bar). Operation of the interior door handle 34 to move the interior door handle 34 from the latched position to the unlatched position may pivot the latch idler 58 causing the roller 128 to roll along the lift track 130 from a lowered position to a raised position, thereby lifting (e.g., vertically lifting) the door 28 from a lowered position to a raised position, respectively, supported by the forearm 52 and the hinge 32. Similarly, operation of the interior door handle 34 from the unlatched position to the latched position may cause the latch idler 58 to move from the raised position to the lowered position, thereby lowering (e.g., vertically lowering) the door 28. The latch idler 58 may additionally be operably coupled to the exterior door handle 36 to operate as described above with respect to the interior door handle 34. The present disclosure, however, is not limited to the foregoing exemplary latch idler 58 configuration of FIGS. 5 and 6.

The one or more weight compensation springs 60 may extend between and connect the forearm 52 and the upper link 56 to facilitate biasing of the door 28 in the raised position (e.g., by overcoming a portion of a total weight of the door 28). The weight compensation springs 60 extend between and to an upper end 122 of the weight compensation springs 60 and a lower end 124 of the weight compensation springs 60. The upper end 122 may be rotatable mounted to the upper link body 110, for example, at (e.g., on, adjacent, or proximate) the outer end 114. The lower end 124 may be rotatably mounted to the shaft body 68 at (e.g., on, adjacent, or proximate) an intermediate portion of the shaft body 68 between the lower end 70 and the upper end 72. For example, the lower end 124 may be rotatably mounted to the shaft body 68 by a fitting 126 mounted to or otherwise formed by the shaft body 68 at (e.g., on, adjacent, or proximate) a middle of the shaft body 68.

Figure 7B:
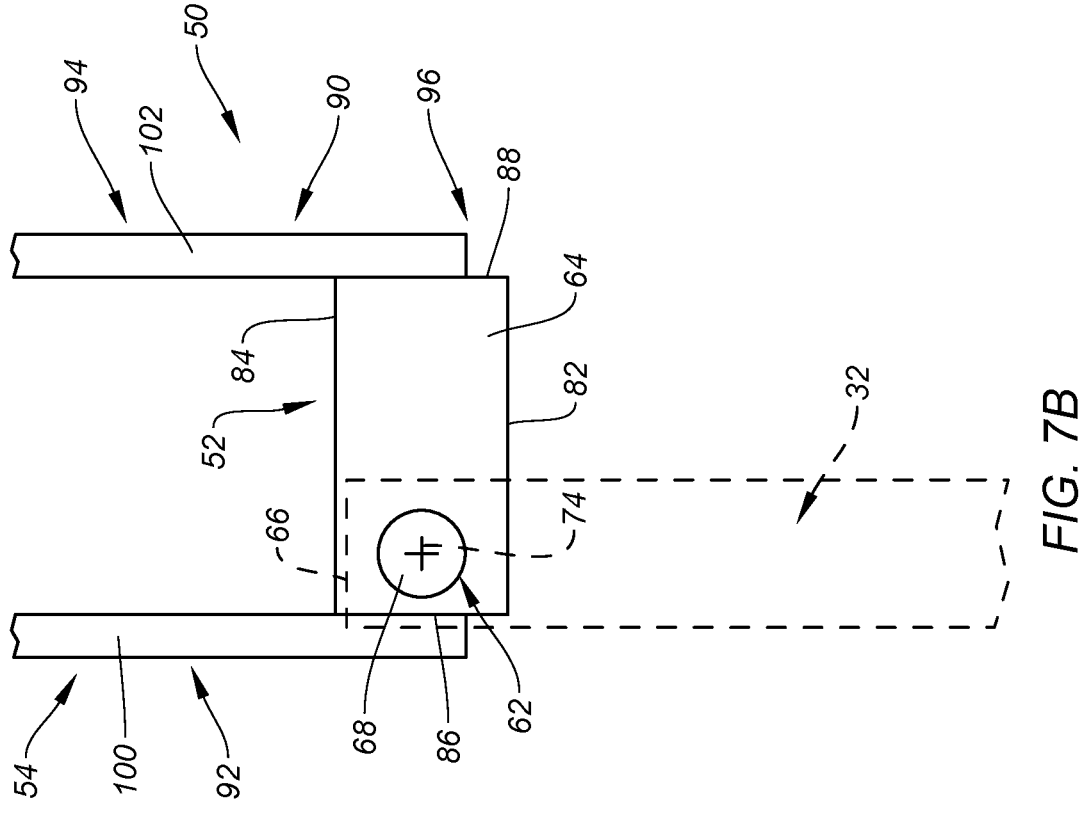
FIGS. 7A-B schematically illustrate various positions of a forearm of the support assembly of FIGS. 5 and 6, in accordance with one or more embodiments of the present disclosure.
Figure 7A:
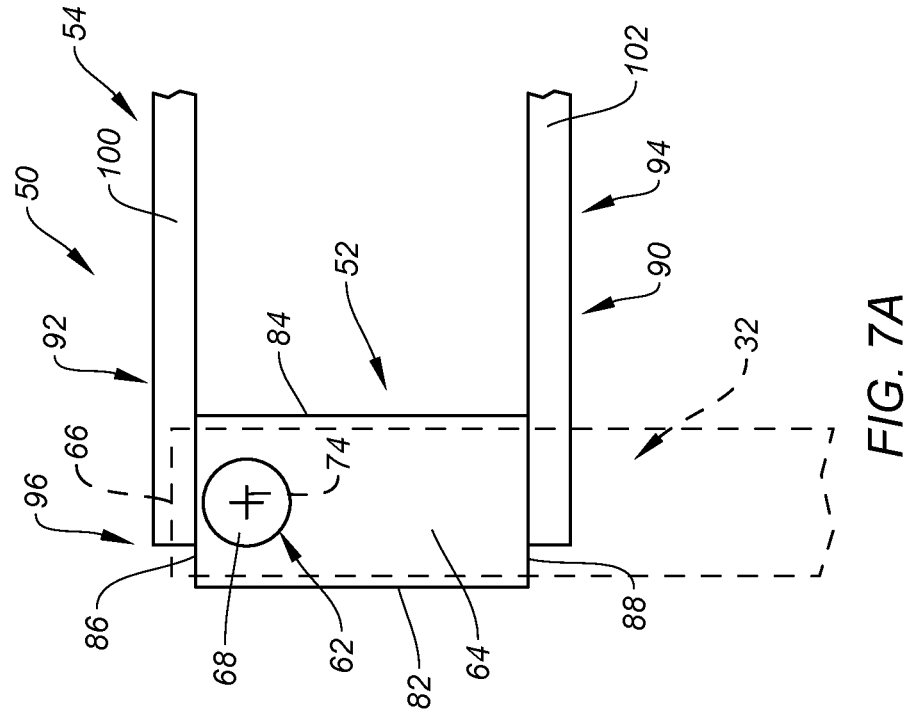
Figure 8B:
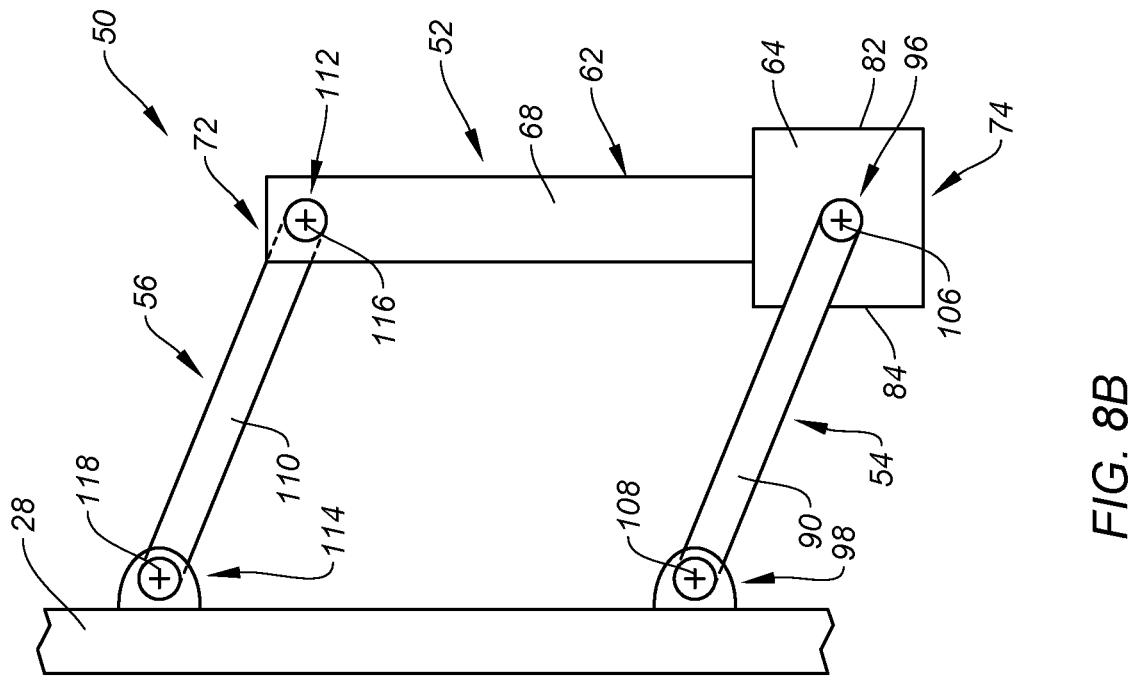
FIGS. 8A-B schematically illustrate various positions of links of the support assembly of FIGS. 5 and 6, in accordance with one or more embodiments of the present disclosure.
Figure 8A:
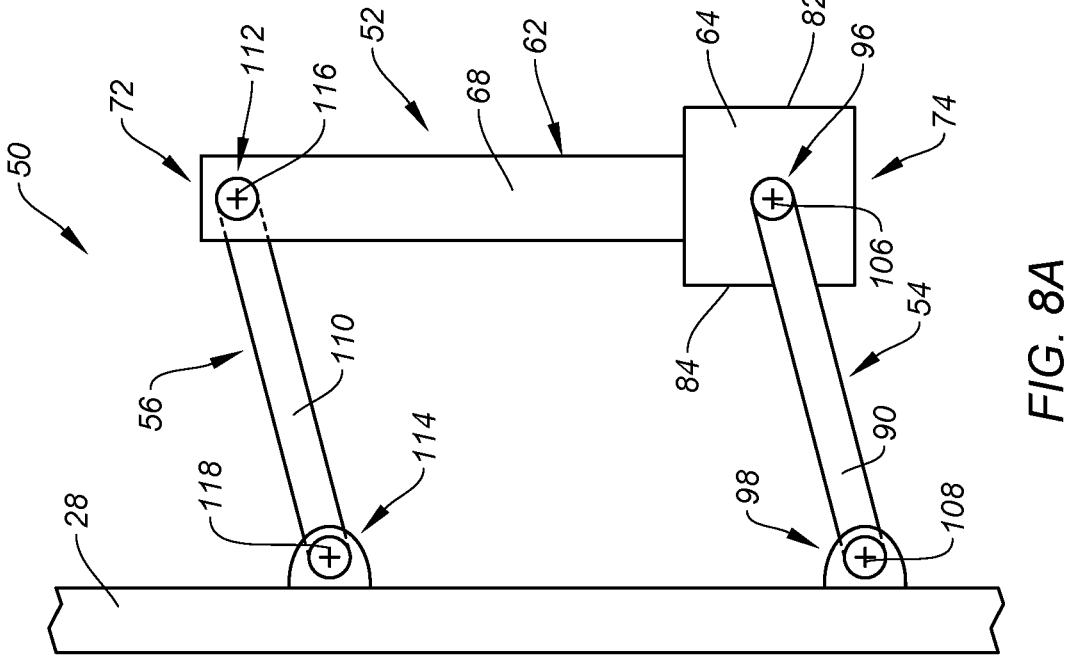

In operation, swiveling motion of the door 28 may be powered by the ESS 38 (e.g., the actuation system 42) connected to the door 28 through the forearm 52 (e.g., the base 64). As shown in FIGS. 7A and 7B, the forearm 52 may rotate from a first rotational position (e.g., with the door 28 in the closed position; see FIG. 7A) to a second rotational position (e.g., with the door in a fully or partially open position; see FIG. 7B) about the rotational axis 74 (see also FIGS. 4A and 4B) as the forearm 52 supports the door 28 during the swiveling motion (e.g., with the lower link 54 and/or the upper link 56). As previously discussed, opening of the door 28 may additionally include an initial lifting motion (e.g., vertically lifting) of the door 28. As shown in FIGS. 8A and 8B, the lower link 54 and the upper link 56 may rotate about the rotational axis 106 and the rotational axis 116, respectively, from a lowered position (see FIG. 8A)

to a raised position (see FIG. 8B) as the latch idler 58 lifts the door 28, thereby supporting and guiding the vertical movement of the door 28.

The configuration of the forearm 52 may facilitate integration of various functions on a single part. Inclusion of the forearm 52 of the present disclosure may thereby obviate a need for conventional mechanical door assembly components such as (1) support fittings to attach stabilizer bars on the door structure, (2) support fittings and mechanisms (e.g., with supports) to connect the ESS 38 (e.g., the actuation system 42) from the door hinge to the door structure, (3) mechanisms (e.g., with supports) to indirectly manage the door lift function, and/or (4) mechanisms (e.g., with supports) to manage the weight compensation function within door structure.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

The terms 'substantially,' 'about,' and other similar terms utilized throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f)

unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A door assembly for an aircraft, the door assembly comprising:
a door;
a door hinge; and
a support assembly rotatably mounting the door hinge to the door, the support assembly includes a forearm, at least one link, and at least one weight compensation spring, the forearm is rotatably mounted to the door hinge along a first rotational axis, the forearm extends along the first rotational axis between and to an upper end and a lower end, the at least one link extends between and to an inner end and an outer end, the at least one link is rotatably mounted to the forearm at the inner end, the at least one link is rotatable relative to the forearm about a second rotational axis, the at least one link is rotatably mounted to the door at the outer end, the at least one link is rotatable about the second rotational axis between and to a lowered position of the door and a raised position of the door, the at least one weight compensation spring extends between and to a lower spring end and an upper spring end, the lower spring end is rotatably mounted to the forearm, and the upper spring end is rotatably mounted to the at least one link at the outer end.

2. The door assembly of claim 1, wherein the at least one link includes an upper link and a lower link, the lower link is disposed at the lower end, and the upper link is disposed at the upper end.

3. The door assembly of claim 2, wherein the lower link includes a first arm portion, a second arm portion, and a lateral portion, the first arm portion and the second arm portion are rotatably mounted to the forearm, the lateral portion extends between and connects the first arm portion and the second arm portion, and the lateral portion is disposed at the door.

4. The door assembly of claim 2, wherein the second rotational axis of the lower link is substantially parallel to the second rotational axis of the upper link.

5. The door assembly of claim 1, wherein the at least one spring is configured to bias the door in the raised position.

6. The door assembly of claim 1, further comprising an emergency puller assist system (EPAS) actuator, and the EPAS actuator extends between and connects the door hinge and the forearm.

7. The door assembly of claim 1, wherein the forearm includes a shaft and a base, the shaft extends between and to the upper end and the lower end, the base is disposed at the lower end, the base extends between and to a proximate lateral end and a distal lateral end radially farther from the shaft than the proximate lateral end relative to the first rotational axis, and the at least one link is rotatably mounted to the base at the proximate lateral end and the distal lateral end.

8. The door assembly of claim 7, further comprising an emergency puller assist system (EPAS) actuator, the EPAS actuator is rotatably mounted to the door hinge, and the EPAS actuator is rotatably mounted to the base between the shaft and the distal lateral end.

9. The door assembly of claim 1, wherein the forearm is configured to rotate about the first rotational axis from a first rotational position to a second rotational position as the door moves from a closed position to an open position.

10. A door assembly for an aircraft, the door assembly comprising:
a door;
a door hinge; and
a support assembly including a forearm, a lower link, an upper link, and a latch idler, the forearm is rotatably mounted to the door hinge at a distal end of the door hinge, the forearm extends between and to an upper end and a lower end, the lower link is rotatably mounted to the forearm at the lower end, the upper link is rotatably mounted to the forearm at the upper end, the lower link and the upper link are rotatably mounted to the door, the latch idler is operably connected to the forearm and mounted to the door, the latch idler is positionable, relative to the forearm, in a raised idler position or a lowered idler position to position the door in a raised door position or a lowered door position, respectively.

11. The door assembly of claim 10, wherein the support assembly further includes at least one weight compensation spring, the at least one weight compensation spring extends between and to a lower spring end and an upper spring end, the lower spring end is rotatably mounted to the forearm, and the upper spring end is rotatably mounted to the upper link.

12. The door assembly of claim 10, further comprising a door handle positionable in a latched position or an unlatched position, the door handle is operably connected to the latch idler, and the door handle is configured to move the latch idler from the lowered idler position to the raised idler position as the door handle moves from the latched position to the unlatched position.

13. The door assembly of claim 10, wherein the forearm is configured to rotate, relative to the door hinge, about a first rotational axis from a first rotational position to a second rotational position as the door moves from a closed position to an open position.

14. The door assembly of claim 13, wherein the forearm extends between and to the upper end and the lower end along the first rotational axis.

15. A door assembly for an aircraft, the door assembly comprising:

a door;

a door hinge; and a support assembly rotatably mounting the door hinge to the door, the support assembly includes a forearm and a lower link, the forearm includes a shaft and a base, the shaft is rotatably mounted to the door hinge along a first rotational axis, the shaft extends along the first rotational axis between and to an upper end and a lower end, the base is disposed at the lower end, the base extends between and to a proximate lateral end and a distal lateral end radially farther from the shaft than the proximate lateral end relative to the first rotational axis, the lower link is rotatably mounted to the base at the proximate lateral end and the distal lateral end about a second rotational axis, the lower link is rotatably mounted to the door, and the lower link is rotatable about the second rotational axis between and to a lowered position of the door and a raised position of the door.

16. The door assembly of claim 15, wherein the lower link includes a first arm portion, a second arm portion, and a lateral portion, the first arm portion and the second arm portion are rotatably mounted to the base, the lateral portion extends between and connects the first arm portion and the second arm portion, and the lateral portion is disposed at the door.

17. The door assembly of claim 15, further comprising an emergency puller assist system (EPAS) actuator, the EPAS actuator is rotatably mounted to the door hinge, and the EPAS actuator is rotatably mounted to the base between the shaft and the distal lateral end.

18. The door assembly of claim 15, wherein the support assembly further includes an upper link rotatably mounted to the shaft at the upper end and rotatably mounted to the door.

19. The door assembly of claim 18, wherein the support assembly further includes at least one weight compensation spring, the at least one weight compensation spring extends between and to a lower spring end and an upper spring end, the lower spring end is rotatably mounted to the forearm, and the upper spring end is rotatably mounted to the upper link.

\* \* \* \* \*